US008136109B1

(12) United States Patent
Birdeau et al.

(10) Patent No.: US 8,136,109 B1
(45) Date of Patent: Mar. 13, 2012

(54) DELIVERY OF DATA AND FORMATTING INFORMATION TO ALLOW CLIENT-SIDE MANIPULATION

(75) Inventors: Lucas Birdeau, San Francisco, CA (US); Clifford Yeh, Los Angeles, CA (US); Michael Peachey, San Mateo, CA (US); Kevin Hakman, San Francisco, CA (US)

(73) Assignee: TIBCO Software Inc., Palo Alto, CA (US)

( * ) Notice: Subject to any disclaimer, the term of this patent is extended or adjusted under 35 U.S.C. 154(b) by 894 days.

(21) Appl. No.: 10/278,728

(22) Filed: Oct. 22, 2002

Related U.S. Application Data

(60) Provisional application No. 60/373,935, filed on Apr. 19, 2002.

(51) Int. Cl.
*G06F 9/445* (2006.01)
(52) U.S. Cl. .................. 717/175; 719/320; 715/760
(58) Field of Classification Search .......... 709/224, 709/201–220; 719/310–320, 328–332; 717/100–103, 114–115, 168–178; 715/760
See application file for complete search history.

(56) References Cited

U.S. PATENT DOCUMENTS

| | | | |
|---|---|---|---|
| 5,280,617 A | | 1/1994 | Brender et al. |
| 5,943,496 A | * | 8/1999 | Li et al. ..................... 719/328 |
| 6,012,098 A | | 1/2000 | Bayeh et al. |
| 6,272,485 B1 | * | 8/2001 | Sragner ........................ 707/1 |
| 6,327,608 B1 | * | 12/2001 | Dillingham .................. 709/203 |
| 6,356,279 B1 | | 3/2002 | Halstead, Jr. et al. |
| 6,380,940 B1 | | 4/2002 | Halstead, Jr. et al. |
| 6,507,856 B1 | * | 1/2003 | Chen et al. ................... 715/205 |
| 6,662,236 B1 | * | 12/2003 | Apte et al. .................... 719/320 |
| 6,732,108 B2 | * | 5/2004 | Factor et al. ....................... 1/1 |
| 6,748,418 B1 | * | 6/2004 | Yoshida et al. .............. 709/204 |
| 6,943,787 B2 | * | 9/2005 | Webb ........................... 345/418 |
| 6,963,930 B2 | * | 11/2005 | Halpert et al. ............... 709/246 |
| 7,000,180 B2 | | 2/2006 | Balthaser |
| 7,028,296 B2 | * | 4/2006 | Irfan et al. .................... 717/178 |
| 7,246,351 B2 | * | 7/2007 | Bloch et al. .................. 717/175 |
| 2002/0012010 A1 | * | 1/2002 | Pasquali ........................ 345/719 |
| 2003/0115287 A1 | * | 6/2003 | Irfan et al. ................... 709/219 |
| 2003/0135543 A1 | * | 7/2003 | Kittredge et al. ............ 709/203 |
| 2006/0123333 A9 | * | 6/2006 | Layman et al. ............... 715/513 |

OTHER PUBLICATIONS

Carrano, Data Abstraction and problem solving with C++, The Benramin/Cummings Publishing Company, Inc, 1995, pp. 353-354.*
Altio. "AltioLive Platform." http://www.altio.com/products/altiolive.htm, 2002.

(Continued)

*Primary Examiner* — Diem Cao
(74) *Attorney, Agent, or Firm* — Baker & McKenzie LLP

(57) ABSTRACT

Delivering data and formatting information includes delivering object definition files from a server to a client; generating definitions and object instantiations at a client using JavaScript or another simple browser-interpreted language, for objects relating to data modeling and presentation; and presenting data using those objects at the client, using a web browser without a separate runtime environment or application plug-in, but maintaining substantial state at the web browser regarding the data itself and the format for its presentation. Definition files are modified to provide object properties consistent with a full object-oriented language, including for example hierarchical inheritance of object properties. Code ballooning generates definitions and individual instantiations, with the effect that a very large amount of DHTML, or another markup or presentation definition language for use with the application, can be generated from relatively small aggregate size of definition files communicated from the server to the client.

31 Claims, 5 Drawing Sheets

OTHER PUBLICATIONS

Curl Corporation. "Surge™ Runtime Environment." http://www.curl.com/html/products/surge.jsp, 1998-2002, Curl Corporation.

Echospace, Inc. "SinglePage™ Technology." http://www.echospace.com/technology.php, 2000-2002, Echospace, Inc.

Isomorphic Software. "Smart web application technology." http://www.isomorphic.com/index.jsp, 2002, Isomorphic Software, Inc.

Nexaweb. "Higher Productivity, Lower Costs." White Paper, 2002, pp. 1-11, Nexaweb Technologies Inc.

Nexaweb. "Nexaweb Smart Client Platform." http://www.nexaweb.com/product.htm, 2002, Nexaweb Technologies, Inc.

Ogievetsky, Nikita. "Data Maintenance on the Web Made Easy with XML Templates." http://www.cogx.com/xml99/presAll.asp, 1999, pp. 1-32.

Refsnes, Jan. "XSL—On the Client." http://www.xmlfiles.com/xsl/xsl_client.asp, 1999-2002, pp. 1-5, INT Media Group.

State Software. "Components, Products Overview, Features & Benefits." http://statesoftware.com, 2002, State Software, Inc.

Vultus. "WebFace Browser Application Platform." http://www.vultus.com:80/products/webface.htm, 2002, Vultus, Inc.

* cited by examiner

DELIVERY OF DATA AND FORMATTING INFORMATION TO ALLOW CLIENT-SIDE MANIPULATION

CROSS REFERENCE TO RELATED APPLICATION

This application claims priority of the following document, which is hereby incorporated by reference as a fully set forth herein.

U.S. provisional patent application 60/373,935, Express Mail mailing number EL734 814 992 US, filed Apr. 19, 2002, in the name of the same inventors, with the same title.

BACKGROUND OF THE INVENTION

1. Field of the Invention

The invention relates to delivery of data and formatting information to allow client-side manipulation.

2. Related Art

To access and present data for manipulation by users, it is often desirable for computer applications to be responsive to user commands (both with accuracy and speed), to be capable of multiple formats for presentation, and to be extendible to accommodate new types of user request or new models of the data. When data is maintained remotely from the user, presentation of that data includes communication (such as using a computer network) of the data from its source (such as a server) to its presentation (such as a user client).

Client-server systems in which data is maintained at a server, presented at a user, and communicated from server to client, include web servers and web client (also known as web browsers). In a web client-server model, the client requests data from the server, in response to which the server sends a document, such as a web page, to the client for presentation to the user. Some problems that have arisen in the known art are that (1) communicating the data from server to client can result in a substantial lag between when the user requests the data and when it is presented, (2) processing at the server can result in substantial processing at the server when the user requests a change in formatting or display, and (3) communicating the web page from the server to the client can use substantial communication bandwidth.

Accordingly, it would be desirable to provide a method of delivering and formatting data, thus providing a web client with the capability of performing a data manipulation application, with the effect that manipulation and presentation of the data can occur at the client side without unnecessary use of resources, either at the server, or for communication between the client and server.

SUMMARY OF THE INVENTION

A method of delivering data and formatting information includes (1) delivering application object definition files from a server to a client, (2) generating object instances at a client using JavaScript or another browser-interpreted language, for objects relating to data modeling and presentation, and (3) presenting data using those objects at the client, using a web browser without a separate runtime environment or application plug-in, and maintaining substantial state at the web browser regarding the data itself and the format for its presentation. In a preferred embodiment, the web browser need not include more than a script language interpreter, a parser for XML or other hierarchical tagged data, and an element for communication with the server. In a preferred embodiment, the web browser also includes an element for rendering and presentation of information to a user. In a preferred embodiment, application object definition files are designed to provide object properties consistent with a full object-oriented language, including for example multiple levels of hierarchical inheritance for object properties. In a preferred embodiment, the client (using a method herein sometimes called "code ballooning") generates object definitions and individual object instantiations, with the effect that a very large amount of DHTML, or another markup or presentation definition language for use with the application, can be generated from relatively small aggregate size of application object definition files communicated from the server to the client.

In an aspect of the invention, an embodiment of the invention manages XML or other hierarchical tagged data in a persistent data store, with the effect of enabling asynchronous communication of data between the server and the client, and with the effect of enabling asynchronous presentation updates at the client without server intervention. This has the effect of allowing the web client to use tagged data objects maintained in the local web browser memory or cache as a query-able database. An embodiment of the invention includes a communication channel between the persistent data store for hierarchical tagged data and the asynchronous presentation updates, with the effect of enabling dynamic partial update of data, or its presentation format, to the user.

An embodiment of the invention also includes a DMA (data manipulation application) DOM (document object model), or other object model for a presentation to a user at the web client, said DMA DOM being separate from a DOM used by the web browser, with the effect that dynamic updates of data and presentation format can be disposed for a later time when the user requests presentation of that portion of the document, and with the effect that the client is capable of implementing a model/view/control model of the presentation and manipulation of data, without using the server to maintain its own model/view or control for that presentation and manipulation of data.

In an aspect of the invention, the set of JavaScript or other application objects provides a substantially rich language, with the effect that the user can use and extend the functionality of the client without requiring a separate runtime environment or application plug-in, or other functionality not already part of the web browser. The user's ability to use and extend the functionality of the client might include one or more of (1) generating GUI objects such as but not limited to windows, tablets, charts, trees, and other GUI elements otherwise not available in the browser's APIs, and handles for manipulating them, (2) generating communication objects, such as for asynchronous communication with one or more server devices, such as for example arrays of invisible I-frames and other objects for managing client/server relationships, and (3) generating data objects, such as for example pointers to items in a data cache, objects for managing garbage collection, and other objects for managing the browser cache.

In an aspect of the invention, the set of JavaScript or other application objects might be tailored to specific needs of a data manipulation application. For example, the application might include specific elements directed to functionality desired for any of the following types of applications: (1) applications for "what-if" actions on data and scenario modeling, such as for example analysis and reporting applications as might be used in business fields like financial services or insurance, (2) applications for automated actions on data, such as for example automated scripting and compliance testing, as might be used in business fields such as health care or financial industries, (3) applications for data sharing among remote users, such as for example those using disparate client devices or heterogeneous client applications, (4) applications for manipulating and presenting data according to business rules, such as for example call centers, enterprise software, and middleware, (5) applications for manipulating and presenting time series data or other complex data located at the remote server, such as for example bioinformatic data or the results of bioscience experimentation or testing, (6) user interfaces for wireless applications, (7) graphical user interfaces for applications delivered to desktop systems.

In an aspect of the invention, the set of JavaScript or other application objects can be serialized into XML or another tagged data structure, and de-serialized from that tagged data structure back into application objects, with the effect that the GUI for the data manipulation application can be defined by the XML or other code for the tagged data structure. In a preferred embodiment, this has the effect that (1) all or part of the data manipulation application, and its current state, can be transferred to another client for use by another user, (2) all or part of the data manipulation application, and its current state, can be maintained in storage and retrieved for later use, by the same or a different user, (3) logical parts of the data manipulation application, such as for example defined program modules, can be maintained in storage and retrieved for later use, such as during development of the data manipulation application or during runtime execution of the data manipulation application, with the effect of adding functionality or application modules to the application when needed or convenient.

DETAILED DESCRIPTION OF THE PREFERRED EMBODIMENT

Figure 1:
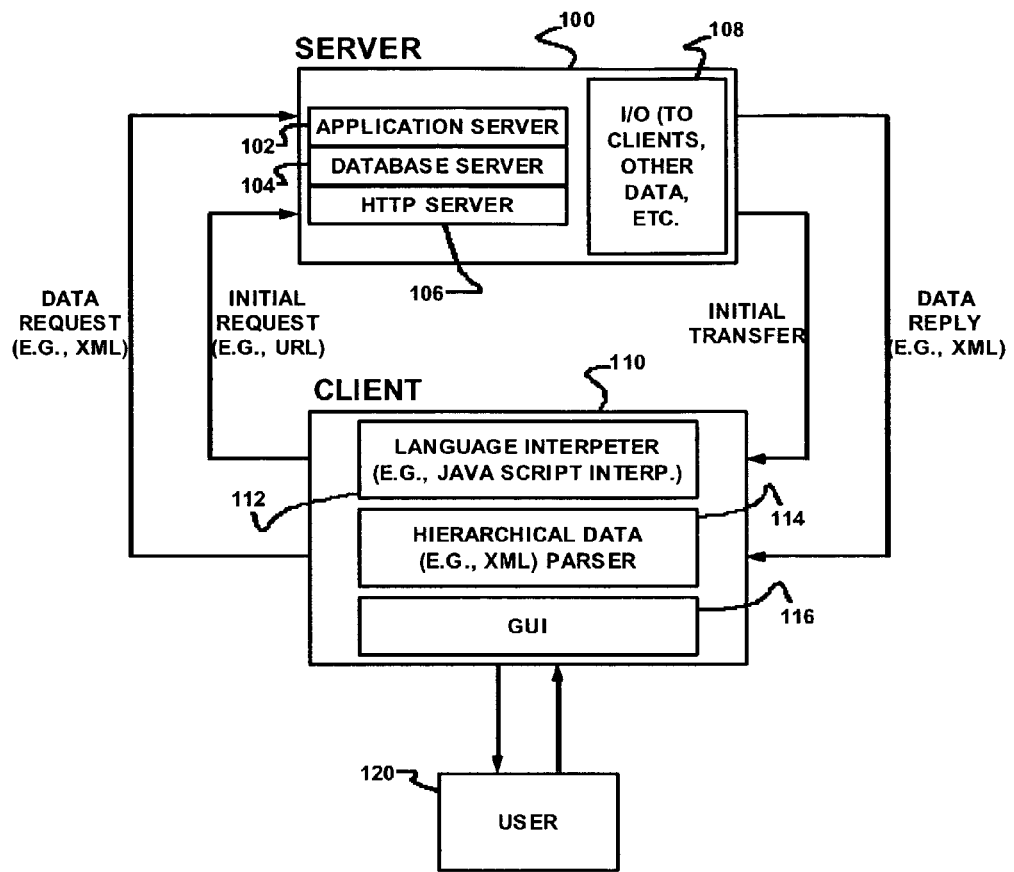
FIG. 1 shows a block diagram of the relationship between a client and a server in a system for delivery of data and formatting information to allow client-side manipulation and presentation of the data.

In the following description, a preferred embodiment of the invention is described with regard to preferred process steps and data structures. Those skilled in the art would recognize after perusal of this application that embodiment of the invention can be implemented using one or more general-purpose processors or special-purpose processors or other circuits adapted to particular process steps and data structures described herein, and that implementation of particular process steps and data structures would not require undue experimentation or further invention.

Lexicography

The following terms refer or relate to aspects of the invention as described below. The descriptions of general meanings of these terms are not intended to be limiting, only illustrative.

The terms "client device," "client," "server device," and "server" generally describe any device taking on the role of a client or a server in a client-server relationship; there is no particular requirement that any client device or any server device must be an individual physical device (each can be either a single device, a set of cooperating devices, a portion of the device, or some combination thereof).

The terms "browser" and "client" describe any software in soft or embedded form capable of being used to retrieve and present data from remote locations.

The term "thin client" describes a client device, browser or client that contains a minimum amount of functionality, for example limited to a script language interpreter, a parser for XML or other hierarchical tagged data, an element for communication with the server, and an element for rendering and presentation of information to a user.

The term "thick client" describes a client device, browser or client that includes functionality beyond that of a thin client, for example more processing power, memory, user interface components, applications, interpreters, run time environments, browser plug-ins, and the like.

The terms "presentation" and "presenting" describe any technique by which data is delivered from the client device to a user. For example, and without limitation, presentation might include visual display, motion pictures, or audio-only. The term "presenting" also can encompass capturing user input and responding to that input by generating, removing or otherwise changing the presentation in response to the input.

The terms "separate runtime environment" and "browser plug-in" describe instruction set interpreters that run in a memory space separate from the memory space of the corresponding client or browser while still being capable of rendering data to a region or sub-region of the client or browser's display window. One example of a separate runtime environment is the Java Runtime Environment. Other examples exist.

The term "browser interpreted language" refers to a language that is interpreted by a browser without a separate runtime environment. One example of a browser interpreted language is JavaScript. Other examples exist.

The term "scripted code" refers to code in a browser interpreted language, for example JavaScript, that can be interpreted by a client or browser.

The terms "object" and "objects" refer to data structures that can inherit properties from other data structures such as in an object oriented environment, or be instantiated as instances thereof in an object oriented environment, or both. More generally, "objects" can refer both to the data contained in those data structures and to the methods or logic by which data in those data structures are manipulated or referenced.

Other and further uses of or possibilities for the invention, including extensions of these terms and concepts, would be clear to those of ordinary skill in the art after perusing this patent application. These other and further uses and possibilities are part of the scope and spirit of the invention, and would be clear to those of ordinary skill in the art without further invention or undue experimentation.

System Elements

FIG. 1 shows a block diagram of the relationship between a client and a server in a system for delivery of data and formatting information to allow client-side manipulation and presentation of the data.

Server 100 preferably includes application server 102, database server 104, and HTTP server 106. The application server processes dynamic requests from clients. The database server maintains data for use by the server in responding to requests. The HTTP (hypertext transport protocol) server processes requests for static data and formats data for transmission using HTTP. In the preferred embodiment, the application server is a WebLogic server, the database server is an Oracle 8i server, and the HTTP server is an Apache HTTP server. Other application, database, and HTTP servers can be utilized. Server 100 also preferably includes interface 108 for communication with clients, data on networks and other servers, and the like.

In the preferred embodiment, client 110 runs a browser for communicating with server 100 and for presenting data to user 120. The client preferably includes at least language interpreter 112, a parser 114 for hierarchical (or otherwise structured) data, and graphical user interface (GUI) 116 for rendering data into text and images and for receiving input from a user. Preferably, the interpreter is capable of interpreting code from server 100, for example JavaScript code or the like. The parser is capable of parsing tagged hierarchical data such as data in the extensible markup format (XML), data structured in a CSV (comma separated value) format, data structured in name value pairs, and the like. In a preferred embodiment, the parser is also capable of parsing other structured data, such as data in JavaScript arrays, and data in other data formats. More generally, the parser is capable of receiving structured data and parsing that data according to a mapping.

In an alternative embodiment, the client does not start with an interpreter, parser, GUI, or some combination thereof. In this embodiment, any or all of these elements can be delivered to the client from the server as an application object file in the initial transfer.

The client can be implemented without a browser, in which case the interpreter and parser can run directly on the client. This arrangement is useful for implementing the invention on hand-held and wireless devices, and the like. Other arrangements are possible.

User 120 communicates with client 110 through a graphical user interface (GUI). In a preferred embodiment, this interface includes GUI elements available through the browser's application programming interface (API), as well as windows, tablets, charts, trees, and other GUI elements typically not available through the browser's API.

FIG. 1 shows two communication paths between server 100 and client 110. The first path includes an initial request from the client to the server for data and an initial transfer data from the server to the client. The second path includes subsequent data requests from the client to the server and replies to those requests.

The initial request can take the form of client 110 accessing server 100 through the server's uniform resource locator (URL). The initial transfer preferably includes an initial hypertext markup language (HTML) formatted page, application object definition files, "code ballooning" and "buildout" instructions for the definition files, translation files, and initial data. These files are interpreted by client 110 in order to generate an object-oriented environment and a data manipulation application that runs in the environment, as explained in more detail below with reference to FIGS. 2 and 3. Upon generation, the data manipulation application preferably presents the initial data to the user.

After the object-oriented environment and data manipulation application have been generated, the application on client 110 can asynchronously request additional or updated data from server 100. In the preferred embodiment, requests for additional data are cast as requests for extended markup language (XML) data. Server 100 preferably replies to the requests with XML formatted data, or structured data in another format recognizable to the client 110. Use of asynchronous delivery of formatted data in this context is distinct from synchronous delivery of rendered web pages, in which the client would request and receive a new web page, such as one formatted in HTML, from the server in order to get updated or additional data.

Figure 2:
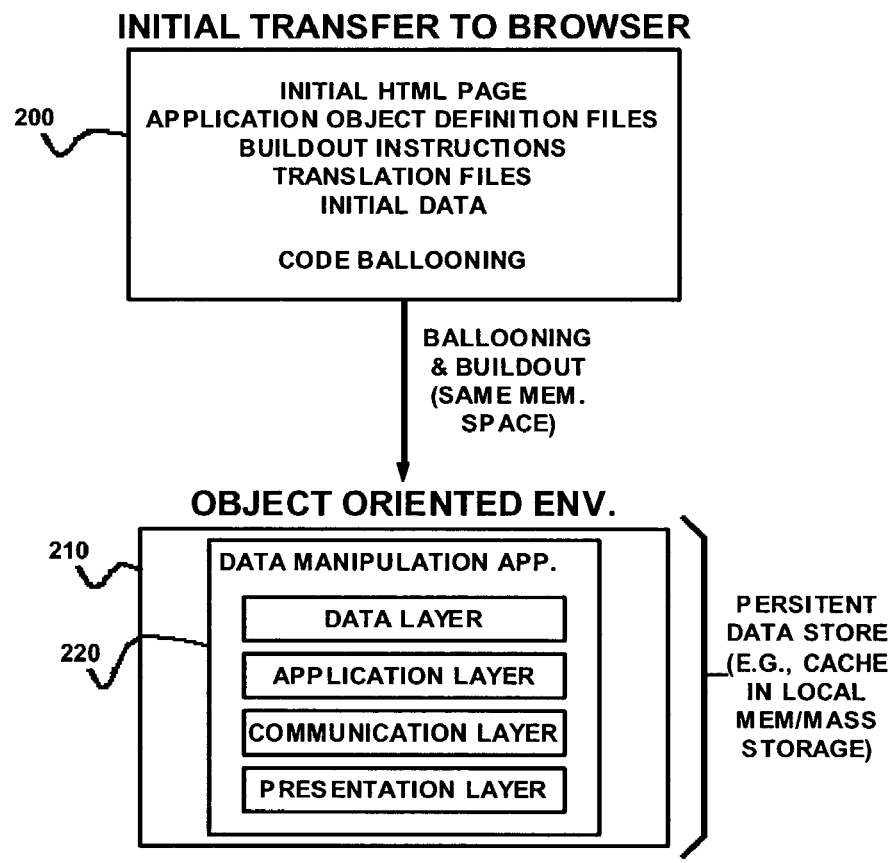
FIG. 2 shows a block diagram of an initial instruction transfer and subsequent generation of an object oriented environment to allow client-side manipulation of data.

FIG. 2 shows a block diagram of an initial data transfer and subsequent generation of an object oriented environment to allow client-side manipulation of data.

As stated above, initial transfer 200 preferably includes an initial HTML formatted page, application object definition files, as well as "code ballooning" and buildout instructions for the definition files, translation files, and initial data. As described below, "code ballooning" refers to method steps in which as the object files delivered to the web client are interpreted by the script interpreter the definition of those files are augmented with the definitions of other object files or partial definitions of other object files so as to define more complex objects and store those in the memory of the client device. The result is one in which objects defined by a designer using an object-oriented technique are augmented, with the effect that an object-oriented environment can be generated using a JavaScript interpreter. As described herein, "buildout" refers to method steps in which the objects defined by the augmented object files are instantiated into an environment defining a data manipulation application. Client 110 preferably displays the initial formatted page.

Language interpreter 112 preferably interprets the buildout or ballooning instructions, which are in turn used to interpret the application object definition files. This process results in object-oriented environment 210.

In a preferred embodiment, client 110 creates object-oriented environment 210 using language interpreter 112 and runs an object-oriented data manipulation application in the environment using interpreter 112 and hierarchical data parser 114, without a need for a separate runtime environment such as a Java Runtime Engine (JRE) or an object-oriented environment plug-in. Of course, separate environments, plug-ins, or both can be present. As described herein, the use of code ballooning allows a developer to design the data manipulation application using object-oriented techniques, so that the data manipulation application is herein sometimes called an object-oriented data manipulation application. However, there is no particular requirement in the context of the invention that the data manipulation application must use object-oriented techniques during its run-time execution at the web client. In alternative embodiments, the data manipulation application might instead use the objects that were augmented during code ballooning and instantiated during buildout without the need for object-oriented capabilities of the run-time execution environment of the web browser.

One advantage of implementing the object-oriented environment through the interpreter is that the environment itself is shipped from the server. Therefore, the environment can be updated on the server side.

In addition, the server can control the exact environment that is implemented on any client, alleviating incompatibility and stability issues. As long as the language interpreter can properly interpret the initial transfer, the environment should function predictably and properly. Because JavaScript can be interpreted across a vast array of platforms, the environment preferably is implemented in JavaScript code. However, any scripted code in a browser or client interpreted language can be used.

Preferably, the interpreter and the environment run in a single common memory space. This is in contrast to separate runtime environments and plug-ins, which run in their own memory spaces. Running in a single common memory space tends to further enhance stability and reduce memory management overhead. Of course, the invention can also be implemented in a fashion that uses plural memory spaces.

The objects for the data manipulation application can occupy a large amount of memory. Sending the entire set of objects from a server to a client could use a large amount of bandwidth, take a long time, or both. The invention addresses this problem through its ballooning and buildout process, with the effect of enabling a very small set of files to become larger through the ballooning process and then larger again through the buildout process. In this manner an initial small set of files can be transferred to the client in a short amount of time, then increased in size on the client so as to create a data manipulation application with many features.

As described above, the phrase "code ballooning" describes method steps in which the object files delivered to the web client are augmented at the web client to define more complex objects, that is, in which objects defined by a designer using an object-oriented technique are augmented at the web client with properties of other objects also delivered to the web client, with the effect that an object-oriented environment can be generated using interpretation of JavaScript received from the server.

The term "buildout" describes method steps in which the augmented objects defined by the augmented object files are instantiated into an object-oriented environment defining a data manipulation application Code ballooning provides the capability instructions that allow objects to inherit properties from other objects. In other words, interpretation of the code ballooning instructions implements an object-oriented environment.

The application object definitions in the initial transfer preferably include a set of base objects and instructions for building other objects from the base objects. These definitions are interpreted in order to build out the objects needed for the data manipulation application. The objects preferably include the elements of the graphical user interface that will be used by the application, as well as the elements for manipulating data and the like.

In the preferred embodiment, the base objects include base objects for windows, tablets, charts, trees, and other GUI elements. These objects could be used to create other objects that inherit properties from these base objects. For example, a window-with-tablets-and-charts object could inherit properties from the window, tablet and chart base objects. Similarly, different base objects for data manipulation, management and processing are used to construct the logic for the application.

The environment preferably enables multiple levels of hierarchical inheritance. Thus, constructed objects can be used to construct more complex objects, etc.

In a preferred embodiment, inherited properties can be overridden. Thus, if an object contains some properties that a developer wants a new object to inherit, but also includes undesired properties, the new object can inherit the properties of the base object. Then, the undesired properties can be overridden, leaving only the desired properties. New properties can be added to replace the overridden properties or simply to extend functionality of the object, either through direct coding or by inheritance from other objects.

Through the code ballooning and buildout processes, the initial data transfer is ballooned and built out to create a large array of objects for use in the data manipulation application. This process can result in multiple levels of both simple and complex objects, and these objects can be used to implement the data manipulation application.

Because the objects are constructed at the client, use of the buildout process can result in considerable savings in the amount of data that must be transferred to implement the application. For example, in one actual implementation of the invention, base objects that occupy less than two hundred kilobytes of data, which is a relatively small amount, build out to a data manipulation application that includes the equivalent of over 200 pages (i.e., several megabytes) of code.

Another advantage of the code ballooning process is that a developer can easily extend the scope of functionality of the object set by constructing new objects from existing objects. Conflicting or unwanted properties in the existing object could be overridden, and new properties added by direct coding or inherited from other objects. For example, a developer who wanted to implement an object for a new type of table in a window would only have to create code for the aspects of the table that differ from an existing table-in-a-window object. The new object could then inherit the properties from the existing object, undesired properties could be overridden, and new properties could be added.

Technical details of one possible implementation of the code ballooning and buildout processes are included in a Technical Appendix at the end of this disclosure.

In addition to the initial HTML page, code ballooning and buildout instructions, and application object definitions, initial transfer 200 preferably includes translation files for translating data from different formats. The translation files preferably enable translation to and from a hierarchical tagged data format such as XML.

Finally, initial transfer 200 also preferably includes initial data for display and manipulation by the application. Other (and different) data and files can be included in the initial transfer depending on the particular implementation of the invention.

Once the objects for the data manipulation application have been built out, all or part of the objects are instantiated in object-oriented environment 210 in order to implement the application. In FIG. 2, the implemented application is shown as data manipulation application 220.

In the preferred embodiment, data manipulation application 220 takes advantage of a multilayered approach. Thus, data manipulation application 220 in FIG. 2 includes a data layer, an application layer, a communication layer, and a presentation layer. Different layers in different arrangements can be used. Furthermore, the application can be implemented without a multilayered approach.

Object-oriented environment 210 and data manipulation application 220, including the objects instantiated during buildout, preferably resides in local memory. However, in alternative embodiments, some elements of the data manipulation application 220 might reside in local mass storage, or other devices for maintaining stored information.

Figure 3:
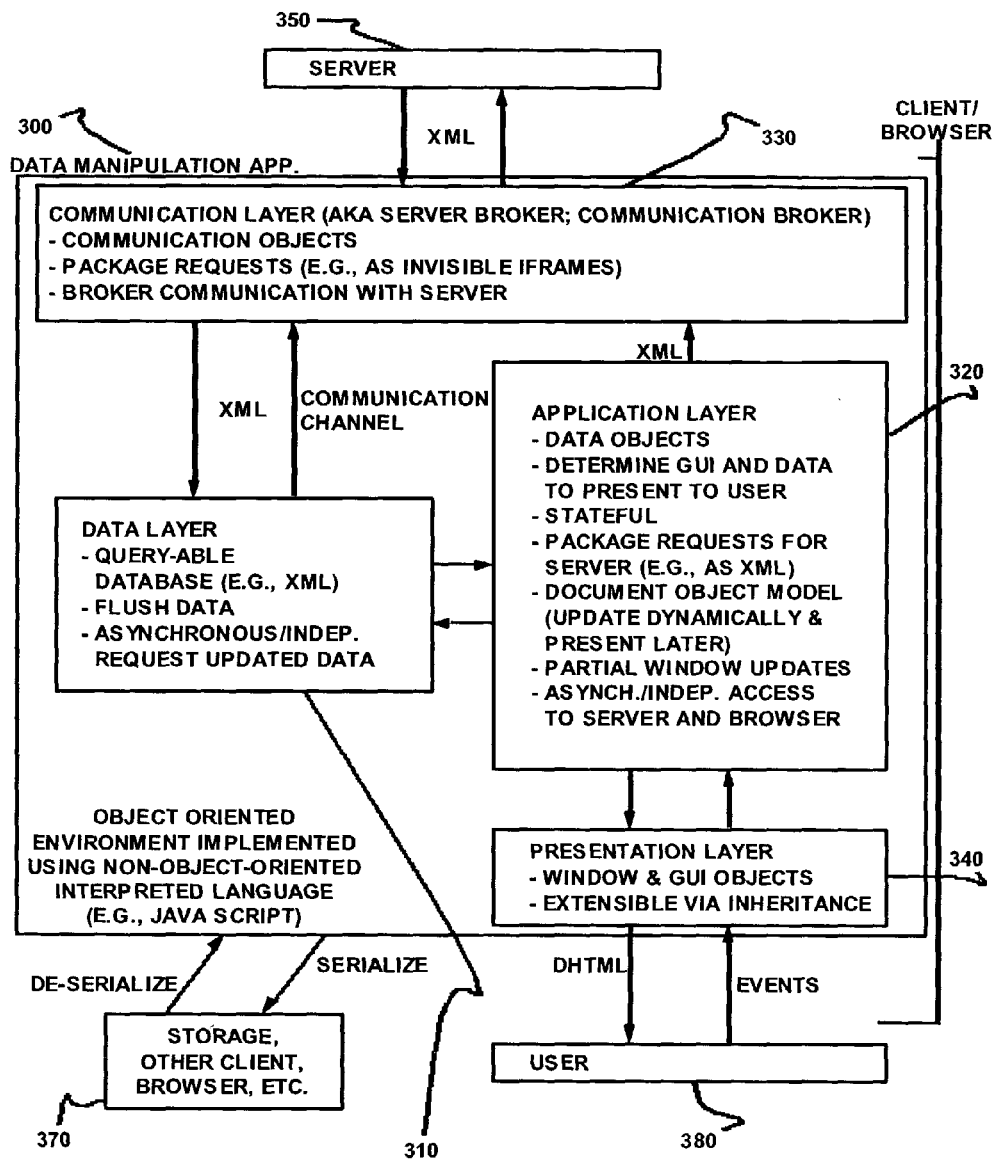
FIG. 3 shows a block diagram of data flow in a data manipulation application according to one embodiment of the invention.

The data manipulation application 220 stores data and is executed in response to contents of the data store, with the effect that the data manipulation application 220 can access data and manipulate data without having to contact a server, as explained in more detail with respect to FIG. 3. Thus, both informational data (for presentation) and instructional data (for execution) for the data manipulation application 220 are maintained in the data store.

Those skilled in the art will appreciate, after perusal of this patent application, that the data manipulation application 220 might obtain additional data, whether informational data or instructional data, from the server. As described herein, obtaining additional data can include asynchronous communication with the server, with the effect that additional data, whether informational data or instructional data, can arrive in parallel with user interaction with the GUI at the web client. FIG. 3 shows a block diagram of data flow in a data manipulation application according to one embodiment of the invention. In FIG. 3, data manipulation application 300 runs in an object-oriented environment. The environment is implemented using a non-object-oriented interpreted language such as JavaScript running on a client or browser, as explained above. Preferably, data manipulation application 300 includes data layer 310, application layer 320, communication layer 330, and presentation layer 340.

Data layer 310 includes data in a query-able database. Preferably, the data is stored as XML data.

The data in data layer 210 can be accessed by data manipulation application 300 asynchronously and independently of accesses to server 350. In the preferred embodiment, application layer 320 of the data manipulation application is responsible for accessing and manipulation the data in data layer 310.

Data layer 310 preferably is responsible for maintaining the data. To this end, the preferred embodiment of data layer 210 can flush old data and request additional and updated data from server 350 through a communication channel.

In the preferred embodiment, data requests to server 350 and data from server 350 are in XML format as opposed to HTML format. XML format is used because the server preferably does not determine the format for displaying the data; rather, application layer 320 formats the data for presentation.

Application layer 320 preferably includes data objects with data from data layer 310. The application layer preferably determines what data to present to a user, as well as what GUI elements and formatting to use for the presentation. This determination can be made on the basis of any logic implemented in the application layer. Such logic could include scientific analysis of data, business rule analysis, "what-if" event driven analysis, processing of requests from and action performed by user 270, and the like.

In the preferred embodiment, application layer 320 is "stateful." In other words, application layer 320 maintains state information about the data and the presentation of the data. This information preferably is maintained by the objects that implement the application layer.

Application layer preferably does not directly access data on server 350. Instead, application layer 320 accesses data through data layer 310. (In alternative embodiments, the application layer could access the server directly, although this is not preferred.)

If application layer 320 determines that it needs to access data that is not present or sufficiently current in data layer 310, application layer 320 can send a request for the data to server 350. Preferably, this request is packaged by the application layer as a request for XML formatted data.

In response to the request, server 350 sends the data, which preferably is in XML format, to the data manipulation application. The preferred embodiment of the application routes the data to data layer 310. Then, application layer 320 can access the data through the data layer.

The application layer preferably implements a DMA (data manipulation application) document object model (DOM) for the data, separate from the DOM used by the web browser. Dynamic updates of data and presentation format can be disposed for a later time when the user requests presentation of that portion of the document.

Application layer 320 can also asynchronously and independently access server 350 and user 370 (e.g., through a browser), using a data cache asynchronously coupled to the server using at least one communication channels enabled by the communication layer. Thus, the application layer can anticipate data that will be needed and request that data without intervention by the user. Moreover, the presentation layer can update and change the presentation without directly accessing the server for new data or formatting information at the time of presentation.

In the preferred embodiment, application layer 320 includes objects that can be used to update a portion of a window or other interface presented to user 370. Thus, when any data or formatting changes, only those portion(s) of the presentation that are affected by the changes need to be updated. The flexibility to update only a portion of the presentation facilitates smooth operation on thin clients and the like. Of course, the entire presentation can be updated if so desired.

Communication layer 330 (also called a server or communication broker) is responsible for brokering communication between the server and the data and application layers. In the preferred embodiment, the communication layer packages requests for XML data from the other layers as invisible IFRAMEs and sends those requests to server 350. In alternative embodiments, however, data or requests can be packaged in other formats, and there is no particular requirement in the context of the invention for the use of any one specific format.

When XML data is received from the server, for example in response to the requests, communication layer 330 preferably parses the data using a parser such as parser 114. The parsed data preferably is routed to data layer 310 for storage in the query-able database. Of course, a different communication model can be implemented without departing from the invention.

Presentation layer 340 is responsible for handling the GUI objects used to present data to user 370. As discussed above, these GUI objects (as well as all other objects in the application) preferably are built using multiple levels of hierarchical inheritance. As a result, the functionality of the GUI objects can be easily modified and expanded to accommodate different data and presentation sets, types and formats.

The presentation layer uses the GUI objects to detect events from the user, for example typing, mouse movements and clicks, voice input, etc. Presentation layer 340 passes information about these events to application layer 320 for processing.

When application layer 320 changes the data or format for presenting the data, these changes are routed through the GUI objects in presentation layer 340. These objects preferably generate dynamic HTML (DHTML) for presentation to the user, for example through a browser. In alternative embodiments, however, information for presentation can be packaged in other formats, such as for example vector graphics instructions, and there is no particular requirement in the context of the invention for the use of any one specific format.

As mentioned above, the data manipulation application is preferably maintained in a data store, such as a local memory. Information relating to the data manipulation application, such as the object definitions which define its functionality, can be serialized into a tagged hierarchical structure, such as for example a data structure formatted using XML, using relationships among objects (such as the DMA DOM) in the data manipulation application as defined by the object definitions. The term "serialization" describes construction of a serial representation in response to the hierarchical object relationships of the data manipulation application. Similarly, the term "de-serialization" describes construction of the hierarchical object relationships of the data manipulation application in response to a serial representation.

Once the environment and application are serialized, the resulting data structure can be transferred to storage, another client or browser, some other destination, or the like. In FIG. 3, this capability is illustrated by serializing to "storage, other client, browser, etc." 380.

The data structure can be de-serialized to recreate the environment and application, as shown by the label "de-serialize" in FIG. 3. The destination of the de-serialization can be the client at which the structure was created or some other destination.

Because the entire environment and application are stored in the data structure, data and state information about the data and its presentation are preserved in the structure. When the structure is de-serialized, the data and state information about the data and its presentation are re-created at the destination of the serialization.

In some cases, it could be desirable to store or send less than all of the environment and application. This can be accomplished by serializing less than all of the objects and data for the environment and application. For one example, additional objects or functionality can thus be delivered while the data manipulation application is already running, such as in response to a user request, in a "just in time" manner, with the effect that features for the data manipulation application might be added to the web client when needed, rather than being pre-delivered to the web client if not needed. For a second example, changes to objects or functionality can also be delivered while the data manipulation application is already running, such as in response to a user request or in response to the server instructing the data manipulation application to update itself.

The environment and application can run on virtually any client that can interpret code and parse data. As a result, all or part of the environment and application can be recreated in completely different types of clients and other destinations. This capability facilitates distribution of the data manipulation application and its current state (if so desired) to virtually any platform. In addition, an environment and application for a less powerful device can be developed on a more powerful device with a high degree of certainty about cross-platform compatibility, thereby facilitating development of applications for thinner clients and destinations.

Method of Operation

Figure 4:
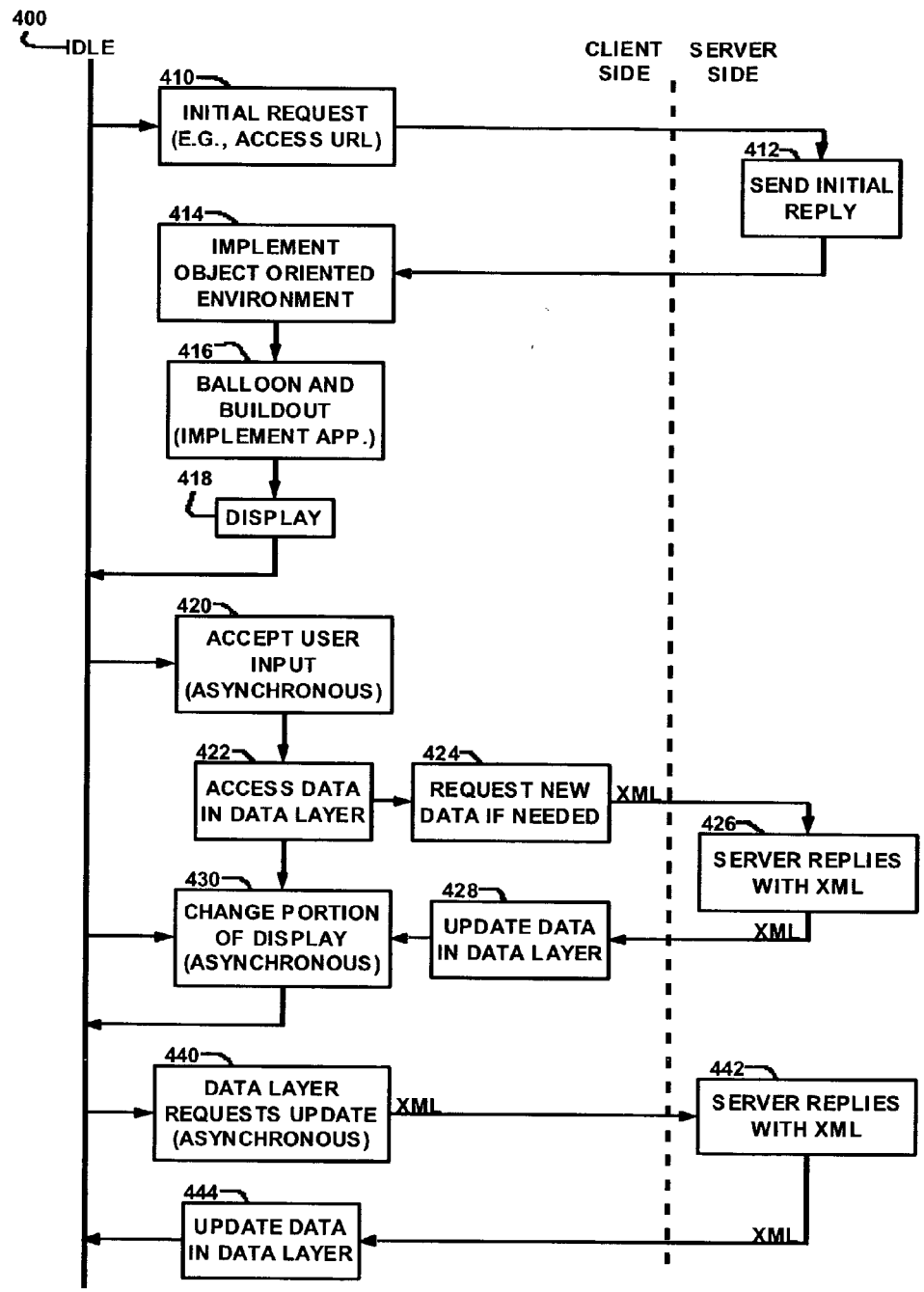
FIG. 4 shows a process flow diagram of a method for delivery of data and formatting information to allow client-side manipulation and presentation of data.

FIG. 4 shows a process flow diagram of a method for delivery of data and formatting information to allow client-side manipulation and presentation of data.

The steps in FIG. 4 are divided into "client side" and "server side." There is no requirement that client side or server side steps occur on a single client or server. More generally, the client and server could even reside on the same device. In addition, while the particular division show in FIG. 4 is preferred, other divisions are possible. Furthermore, all of the steps can be implemented on a single device, in which case no division is necessary.

Preferably, the steps in FIG. 4 are event or object driven. The starting point for the steps is idle state 400.

An initial request for data from a server is made in step 410. This request can take the form of accessing a server through the server's URL. Other forms are possible. This step can be skipped if the client is ready to receive data from the server.

The server responds with an initial reply in step 412, preferably in the form of scripted code in a browser-interpreted language such as JavaScript. Other forms and languages can be used.

The client interprets the initial reply in step 414 in order to implement an object-oriented environment. Then, in step 416, objects from the initial reply are ballooned and built out, with the effects that the objects are augmented and instances of the augmented objects are generated, implementing a data manipulation application.

In step 418, initial data from the initial reply is displayed by the data manipulation application.

User input can drive the application. In step 420, user input is accepted. This input can be asynchronous with respect to the client, the server, and presentation of the data by the data manipulation.

In response to the user input, the data manipulation application can access data in its data layer. This is shown as step 422. If needed data is not in the data layer, additional or updated data can be requested from the server in step 424. The request preferably is sent in the form of a request for XML data, although such need not be the case.

In step 426, the server responds to the request with data. Again, the data preferably is in XML format. The data from the server is used to update the data manipulation application's data layer in step 428.

In step 430, the portion of the display affected by the user's request is updated. Preferably, only that portion is updated, although the entire presentation can be updated if so desired.

In some instances, flow will proceed directly from step 420 to 430. For example, if the user's input requests a change of format that does not require new data, flow can skip steps 422, 424, 426 and 428. Likewise, if the request is for data that is already present in the application's data layer, steps 424, 426 and 428 can be skipped.

Finally, the application layer (or other logic) in the data manipulation application can determine that all or part of the presentation should be changed. In that case, step 430 can occur by itself. In that case, step 430 can occur asynchronously and independently of any action or even by the user or server.

Another event that can occur in the preferred embodiment is that the data manipulation application's data layer can asynchronously and independently receive additional or updated data. For example, the application layer can determine that certain data is stale and needs to be updated. To do this the application layer sends a request to the communication layer, the communication layer requests new data from the server, and upon receipt of the response from the server sends the response data to the data layer. Then if desired, the appropriate GUI elements are notified of the availability of new data and redraw themselves such that the new data appears to the user. Such an event is shown as step 440 in FIG. 4. In that step, a request for data is sent to the server, preferably in XML format.

The server replies with the requested data in step 442. Then, in step 444, the database or other structure for storing the data is updated.

Figure 5:
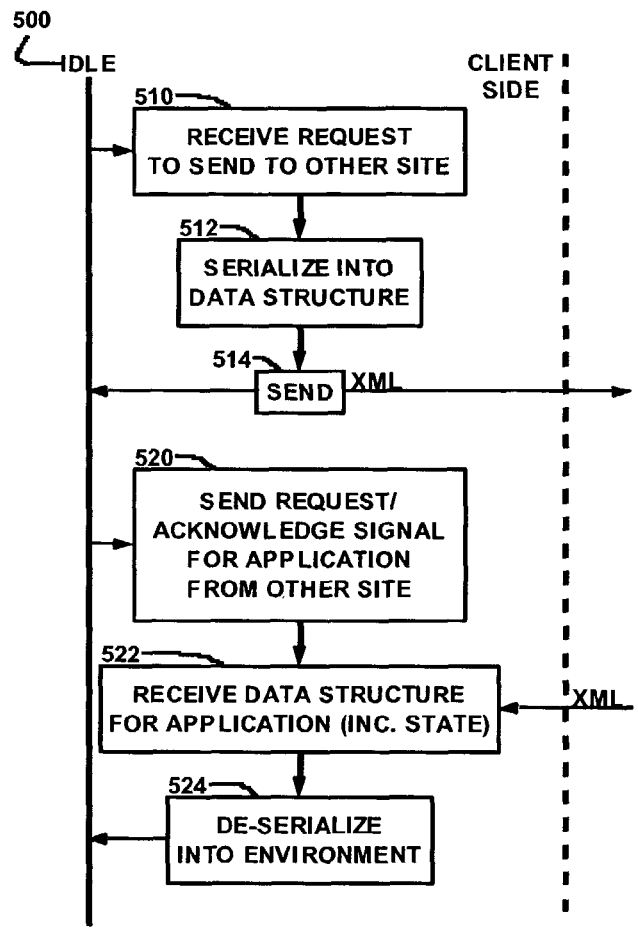
FIG. 5 shows a process flow diagram of a method for sending and receiving a data manipulation application to allow client-side manipulation of data.

FIG. 5 shows a process flow diagram of a method for sending and receiving an object oriented environment to allow client-side manipulation of data.

The steps in FIG. 5 are shown as "client side" steps, with communication directed outside of the client (arrows). There is no requirement that client side steps occur on a single client. In addition, while the particular division show in FIG. 5 is preferred, other divisions are possible.

The client is idle in step 500. In step 510, a request is received to send all or part of the client's data manipulation application (possibly including data and state) to another client or destination. In step 512, that part of the data manipulation application is serialized into a data structure. Preferably, the data structure is a hierarchical data structure in XML format, although other structures and formats can be use. The data structure is sent from the client to the other client or destination in step 514.

A data manipulation application that has already been serialized can be recreated on the original client or on another client or destination. Steps for this process begin at step 520. In that step, a request for a data manipulation application can be sent from the client. Alternatively, another client or destination can request that the client accept a serialized data manipulation application, and the client can acknowledge the request. Other methods for initiating the process exist and are within the scope of the invention.

In step 522, a data structure that contains the serialized data manipulation application is received. The data structure is de-serialized in step 524, at which point the data manipulation application, possibly including data and state information for the data manipulation application, are recreated on the client.

Although described serially, the flow points and steps shown in FIGS. 4 and 5 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

Furthermore, the steps in FIGS. 4 and 5 preferably incorporate error handling and the like, including handling of requests for data that is not present or available on the server. Incorporation of error handling and the like would not require undue experimentation or further invention.

Deserialization of the data manipulation application, and its data structures, can also be used to deliver all or part of a data manipulation application to a client from a server, from a data repository, or from some other sources, not just from a first client to a second client. Deserialization can also be used to deliver features of a data manipulation application "just in time" to a data manipulation application that is already built out or even in the process of executing. Similarly, serialization of all or part of a data manipulation application into a data structure enables that serialized data structure to be saved, whether at a server or at a storage device or otherwise, for retrieval at a later time, with the effect that a user can save the state of all or part of the data manipulation application. The state-saved data manipulation application can then be retrieved for later use, or otherwise examined (such as for example by developers for debugging or improvement of the data manipulation application).

Generality of the Invention

The invention is useful for, and has sufficient generality for, a wide variety of applications. These might include one or more of the following:
- applications for automated actions on data in regulated industries, such as for example automated scripting and compliance testing, as might be used in business fields such as health care or financial industries;
- applications for automated actions on data and "what-if" scenario modeling, such as for example those used in business fields such as insurance or financial industries;
- applications for data sharing among remote users, such as for example those using disparate client devices or heterogeneous client applications;
- applications for manipulating and presenting data according to business rules, such as for example call centers, electronic medical records, enterprise portal software, and business intelligence software, supply chain management software, and other enterprise software;
- applications for manipulating and presenting time series data or other complex data located at a remote server, such as for example bioinformatic data, the results of bioscience experimentation or testing, the results of any other type of scientific experimentation or testing, and any other time series or complex data;
- user interfaces for desktop applications, hand-held applications, wireless applications, and the like;
- any applications where client-server bandwidth is limited or at a premium; and
- any client-server applications where it is desired not to install software for the functional purpose intended by the application on the client device.

Although preferred embodiments are disclosed herein, many variations are possible which remain within the concept, scope, and spirit of the invention. These variations would become clear to those skilled in the art after perusal of this application.

Those skilled in the art will recognize, after perusal of this application, that these alternative embodiments are illustrative and in no way limiting.

TECHNICAL APPENDIX

The following information provides technical details of one possible implementation of the invention, including an initial transfer of data, ballooning of a portion of the data, generation of an object-oriented environment and data manipulation application for a second portion of the data, and operation of the application. Other implementations are possible without departing from the scope and spirit of the invention.

PATH 1: Instantiating an application and generating a GUI for the application on a client.

1) Transfer non-compiled instruction sets (A) consisting of one or more files from server to client. In the preferred embodiment this is a HTML file that mostly provides pointers to other files to be loaded. However this could be a JavaScript files that provides pointers, or a combination of XML and JavaScript files that together provide pointers to load other files.

2) Instruction set A causes additional non-compiled instruction sets (B) consisting of one or more files to be transferred from server to client. B could be on the same server as A or a different server with which the client can communicate.

note that in some cases server and client may be the same physical piece of hardware. And in some cases the server may be simply a file system and may not be Internet connected.

** in the preferred embodiment the client is a web browser, and the instruction sets are files substantially conforming to standards of html, JavaScript, and XML files.

3) Instruction sets B are passed to the client's script interpreter (CSI) where first, sub-element B.1 is interpreted and loaded into memory. Subsequently, the remainder of B is passed through the interpreter and leveraging the methods in B.1 (described later), B.2 inherits all the properties of B.3 and portions of B.4, and perhaps other sub-elements in B and effect becomes an object in memory with a handle B.2 that in fact has all the traits defined in B.2 and concatenated with those of B.3 and concatenated with the specified portions of B.4. Furthermore for example, when the file B.7 is loaded into memory by the interpreter and given a handle B.7, B.7's instructions call a method that concatenates B.2 to its in-memory definition, which in turn concatenates again B.3 and portions of B.4 and others to B.7. The result of this method is a very complex set of in-memory objects instanced by a process of concatenating child objects' properties with their parent object's properties and portions of other object properties as needed. Thus with a very small amount of files transferred, pursuant to the initial instruction set for concatenation processing, complex objects are defined in memory and are ready to be utilized by the next set of instructions C.

4) Instruction sets C are passed to the client's script interpreter and according to the instructions instantiates objects creating additional in-memory objects such as B.2.1, B2.2, B.7.1, B7.2, B3.1 and assigns properties to those instances. Each object as it is instantiated may be assigned a unique name which later creates a way to refer to that object programmatically (a handle). In addition methods in the B.1 object which all objects ultimately inherit from, enable each instance of an object to obtain a unique ID serving as an additional programmatic handle to an object. Furthermore, object properties support a parent property. For example upon instantiation of B2.1 a property is set identifying B3.1 as B2.1's parent object. Therefore each object can know who its parent is and who its children are. As a general structure created pursuant to the method described herein we refer to this family-tree-like structure as the "Application Object Family Tree".

4a) The parent-child relationships of objects and the Application Object Family Tree structure are useful in that they provide a singular map to the parent-child relationships between all objects. One of the elements of instruction set B is a serialization/de-serialization element. The serialization functions of this element take as input an object in the Application Family Tree and as output return an XML or other tagged data structure embodying the state of the input object and all of its children. In reverse the de-serialize function takes an XML or other tagged data input and instantiates objects in memory of the client, and optionally calls the rendering function of that object (see step 6 below). Accordingly de-serialization is another method of instantiating an application and its state in memory. (Steven—Serialization/De-Serialization is useful for other purposes as well as you've described in you outline.)

5) Instruction set D is the specific application logic for the application being instantiated. This code changes between implementations and is used to define the specific functionality of the application. Instruction sets A, B, C, and D could conceivably all be contained in a single file. However, A would have to come before B which would have to come before C. The order of D is not necessarily important.

6) Certain files contain rendering functions. Therefore when objects are instantiated into memory, some in-memory objects will contain those rendering functions. When the rendering function of any object having such a function is called, the function obtains the properties of the object and provides those to the rendering function. Then the rendering function based on those properties, programmatic code, mathematical formulas, etc. . . . outputs an instruction set formatted in a manner interpretable by the client rendering engine (RE). In the preferred embodiment the instruction set is HTML, DHTML or vector based rendering instructions. However it could be video instructions, animation instructions, audio instructions, or other visual/audio/media instruction sets. In certain instances, the output may be in a language interpretable by other interpreters contained in the client or in some cases sent to the server for interpretation and is not necessarily limited to the visual display of information. One example of this is that a portion of the rendering function may be in XSL which provides instruction sets for parsing stored XML structures creating a HTML/DHTML/vector/other based set of rendering instructions.

The result of programmatically calling the rendering function of an object is the on screen display of that object and its children in the current state as defined by its current properties. Thus calling the rendering routine of the "root" object—the parent of all parents—generates the entire application interface. Programmatically, any object's rendering routine can be invoked so as to only update portions of the application display without requiring a re-generation of the entire application display. For example, only when B.2.1's rendering function is invoked does B.2.1 output an instruction set resulting in a visual representation of B.2.1—an object in memory—on screen. Such rendering instructions generally create both a display of data as well as controls for users to interact with that data. These controls capture mouse and keyboard events and pass those events to the business logic (D) of the application so that based on the event or programmatic subroutine executed, other business logic can be invoked which may include sending instructions to the XML data store (DS), various GUI objects such as B.2.1, or the ServerBroker object (SB). Note that DS and SB are both objects resulting from the processes of steps 1, 2, and 3 herein.

PATH 2: Exchanging data between the server, GUI objects, and the client-side XML data store.

Requests

1) Requests are formatted into XML according to the business logic which calls a ServerBroker function that prepares messages to be sent and organizes those messages in a queue to be sent. The messages are sent via the communication mechanism of the browser to the server.

Responses

2) When the server responds to a request, it returns a set of structured data to the communication mechanisms to the browser. The ServerBroker object accepts the incoming data stream and passes it to the XML database. In the preferred embodiment the structured data is in the form of XML and the browser's XML parser processes the XML stream and makes its values available to the application assigning handles to each value according to the structure of the hierarchy and names of tags. However it is envisioned that in the event an XML parser is not present in the browser, that the script language itself would provide a means to traverse the XML data and extract values accessible by the handles defined by the encapsulating tags and organize that data in a hierarchical manner. Once parsed, The XML Database object organizes the structured XML data and provides additional handles for managing and accessing the data. The ServerBroker maintains multiple hidden windows through which is communicates with one or more servers issuing one or more requests and is capable of passing data to the XML database in the order that that data arrives as opposed to in the order that the data was requested. This means that multiple requests can be issued asynchronously without dependence upon completion of prior requests. In another instance sequential communications are desired and a setting allows the ServerBroker to manage this.

3) Upon a response to a request the ServerBroker passes the incoming data to the XML Database, then notifies the application that the data is ready, then the application notifies the GUI element to render itself. In another instance the ServerBroker notifies the GUI element directly upon receipt of new data.

4) The GUI presentation element's properties (its model) is updated programmatically updating the necessary values with the data in the XML database. In another instance the display of data contained by for example a table object is updated by parsing a set of XML data according to instructions sets contained in XSL or another tagged data querying language where the XML and XSL pointers are properties of the table object.

5) The render function of the GUI object is invoked and it outputs rendering instructions that, when passed to the browser rendering engine, produce the interface and display the data (its view). The instruction set also contain instructions defining valid user interactions such as mouse events and keyboard strokes that upon occurring invoke methods of other elements of the applications or execute business logic within the application. The scope of possible user interactions and the associated business rules surrounding those interactions (its controls) are embodied in the object definitions in memory. For example, the table object has a control for resorting information it contains. Capturing a mouse-click event within the visual representation of a column header of that table, meaning in its view, invokes a control that instructs some business logic to retrieve the XML structure associated with this table, manipulate that data according to the applicable business rules, pass the result to the render function of that table, and call the render function of that table to display the manipulated data. In another instance, this method could be used to generate on-screen graphs using in-memory graph objects that subscribe to sets of data in the XML database. Via this method users are able to play "what if" scenarios by changing both graph object and data selection parameters, with each change calling the render function of the graph again.

PATH 3: Just-in-time delivery of additional application functionality

After an application is instantiated and running additional application functionality can be added when needed using the same file pointer, code ballooning, and instantiation methods described earlier in Path 1. In one case this occurs via serialization and de-serialization as described earlier. For example if a user wanted to view as set of data in the form of a pie chart, but the pie chart object had not been instantiated at the time the application was initialized, then the application may request additional files to be sent to the browser that balloon into the pie chart object, which is then instantiated, associated with the set of desired data, and then rendered to the screen for the user. The supplemental file and the in-memory complex object that results from the ballooning process is now a part of the overall and integral part of the application.

What is claimed is:

1. A method of receiving data and formatting information, comprising the steps of:
   receiving object definition files from a server at a client, the object definition files comprising first data structures and instructions for generating second data structures from the first data structures, the second data structures representing application objects;
   generating the second data structures and instantiations of the application objects at the client using a human-readable interpreted language, for objects relating to data modeling and presentation; and
   presenting data using the instantiations of the application objects at the client,
   wherein the generating and presenting steps are performed, at least in part, by a client browser, and wherein the client browser comprises:
   a script language interpreter, wherein the script language interpreter is operable to interpret the object definition files received at the client in order for the client browser to generate the second data structures and instantiations of the application objects at the client;
   a parser for structured data, wherein the parser for structured data is operable to parse the first data structures in order for the client browser to generate the second data structures and instantiations of the application objects, and
   an element for communication with the server and for presenting data.

2. A method as in claim 1, wherein the second data structures and the application object instantiations are generated without a separate runtime environment or application plug-in for the browser.

3. A method as in claim 1, further comprising the step of maintaining substantial state information at the browser regarding the data and a format for presenting the data.

4. A method as in claim 1, wherein the script language includes JavaScript and the structured data includes extensible markup language data.

5. A method as in claim 1, wherein the object definition files are interpreted and built out to provide object properties consistent with a full object-oriented language.

6. A method as in claim 5, wherein the object properties include multiple levels of hierarchical inheritance of object properties.

7. A method as in claim 5, including steps of
   generating in-memory object definitions in response to object definition files, and
   generating individual object instantiations in response to said in-memory object definitions.

8. A method as in claim 1, wherein the application object instantiations form a data manipulation application.

9. A method as in claim 8, wherein the data manipulation application maintains state information for the data modeling and presentation.

10. A method as in claim 9, further comprising the steps of serializing all or part of the application objects into a tagged data structure.

11. A method as in claim 10, further comprising the step of de-serializing all or part of the tagged data structure back into the application objects.

12. A method as in claim 11, wherein all or part of the tagged data structure is transferred to and de-serialized at another client or destination, thereby transferring all or part of the data manipulation application and its current state.

13. A method as in claim 10, wherein all or part of the tagged data structure is stored for later retrieval, thereby storing all or part of the data manipulation application and its current state for later use by one or more different users.

14. A method as in claim 10, wherein during development of the data manipulation application, all or part of the tagged data structure is stored for later retrieval, thereby storing all or part of the data manipulation application and its current state for further developments and use.

15. A method of receiving, presenting and allowing client-side manipulation of data, comprising the steps of:
   receiving a transfer of data from a server, a first portion of the data comprising first data structures and instructions for generating second data structures from the first data structures;
   interpreting the first portion of the data so as to generate the second data structures, an object oriented environment, and instances of objects on the object oriented environment;
   generating a presentation of a second portion of the data using the objects; and allowing manipulation of the presentation through the objects, wherein the interpreting and generating steps are performed by a browser, and wherein the browser comprises:

a language interpreter that interprets the first portion of the data, wherein the language interpreter is operable to interpret the object definition files received at the client in order for the client browser to generate the second data structures and instantiations of the application objects at the client; and a parser for the structured data, wherein the parser for structured data is operable to parse the first data structures in order for the client browser to generate the second data structures.

16. A method as in claim 15, wherein the step of the interpreting utilizes code ballooning.

17. A method as in claim 15, wherein the objects maintain state information about presentation of the second portion of the data.

18. A method as in claim 17, wherein the objects maintain state information about the second portion of the data.

19. A method as in claim 15, wherein the presentation utilizes a graphical user interface generated by the browser.

20. A method as in claim 15, wherein the browser lacks a separate runtime environment.

21. A method as in claim 15, wherein the interpreting step is performed in a same memory space as used by the browser.

22. A method as in claim 21, further comprising the steps of:

requesting additional or updated data; and receiving the additional or updated data in the form of structured data.

23. A method as in claim 15, wherein the object oriented environment allows inheritance of properties between the objects.

24. A method as in claim 23, wherein the inheritance includes multiple levels of hierarchical inheritance.

25. A method as in claim 15, wherein the object oriented environment includes a data layer.

26. A method as in claim 25, wherein the data layer can be updated asynchronously with respect to the presentation.

27. A method as in claim 25, wherein the presentation can be updated asynchronously with respect to the data layer.

28. A method as in claim 25, further comprising the steps of:

serializing all or part of the application into a tagged hierarchical data structure; and transferring the serialized environment to another client or destination.

29. A method as in claim 28, wherein the other client or destination deserializes at least a portion of the application, thereby duplicating at least a portion of the object oriented application, data and presentation.

30. A method of sending data to allow presentation and client-side manipulation of the data, comprising the steps of:

transferring data from a server, a first portion of the data comprising first data structures and instructions for generating second data structures from the first data structures, wherein the first portion of the data can be received at a client browser and interpreted within the client browser such that the second data structures, an object oriented environment, and instances of objects in the object oriented environment are generated at the client browser, a second portion of the data using the objects are presented at the client browser, and to allow manipulation of the presentation through the objects, and wherein the client browser comprises:

a script language interpreter, wherein the script language interpreter is operable to interpret the object definition files received at the client in order for the client browser to generate the second data structures and instantiations of the application objects at the client, a parser for structured data, wherein the parser for structured data is operable to parse the first data structures in order for the client browser to generate the second data structures, and an element for communication with the server and for presenting data.

31. A method as in claim 30, further comprising the steps of:

receiving a request for additional or updated data; and transferring the additional or updated data in the form of structured data.

* * * * *